Sept. 10, 1957   W. JACKSON, JR., ET AL   2,805,574
WIDE RANGE FLOW METER
Filed Sept. 22, 1952
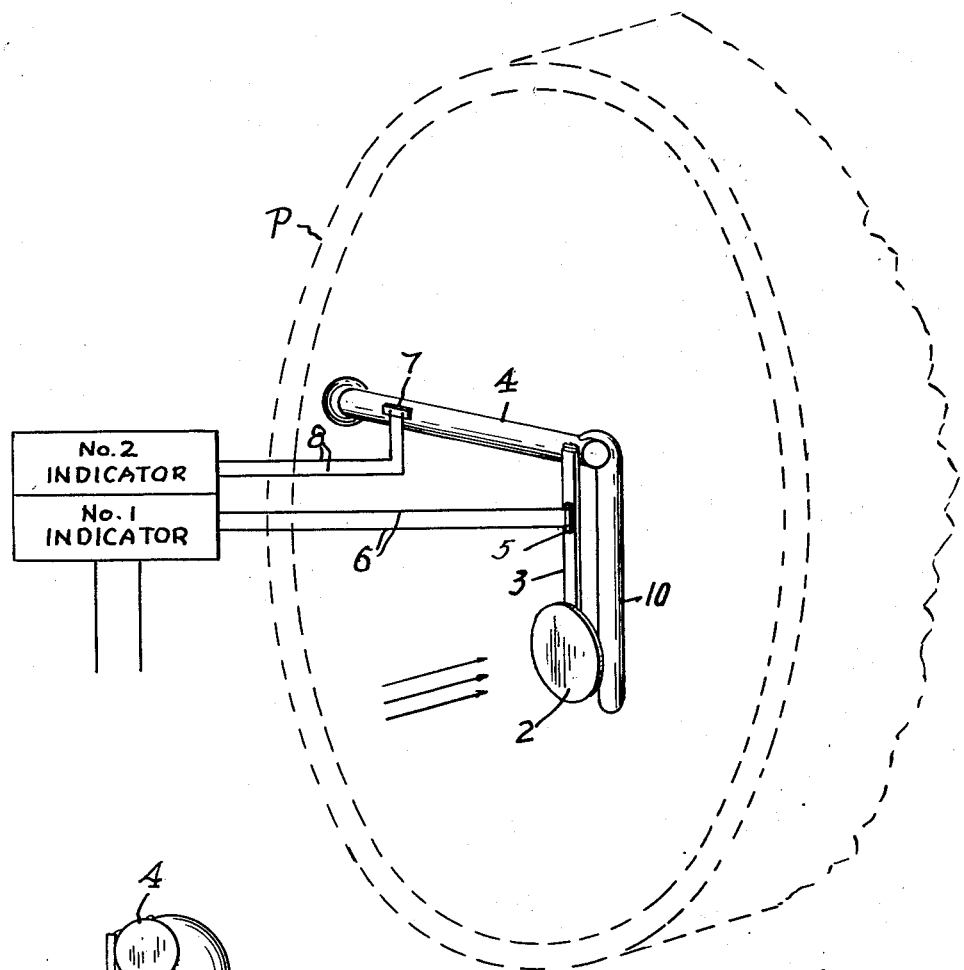
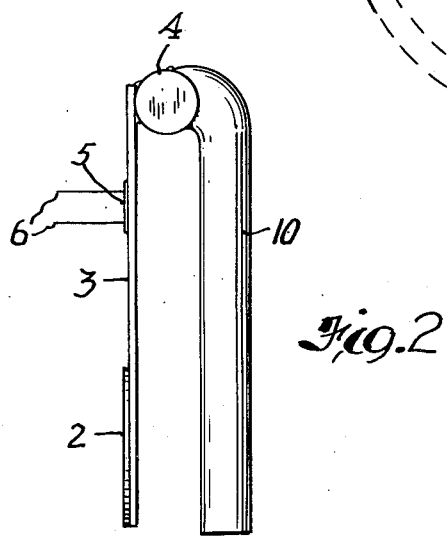
INVENTORS
WARREN JACKSON, JR. AND
WILLIAM E. BAKER.
BY
Oberlin & Limbach
ATTORNEYS.

2,805,574

WIDE RANGE FLOW METER

Warren Jackson, Jr., Lyndhurst, and William E. Baker, Cleveland, Ohio, assignors to The Standard Oil Company, Cleveland, Ohio, a corporation of Ohio Application September 22, 1952, Serial No. 310,860

4 Claims. (Cl. 73—228)

Flow meters of the type having a suspended surface exposed to the pressure of flowing fluid and with arrangements to translate the pressure results into rate of flow are delicate and are sensitive in low flow rates, but their capability of handling heavier flow rates soon reaches its limit. On the other hand, constructions sufficiently rugged to handle heavy flow rates are lacking in fine sensitivity to such an extent as to be deficient in desirable accuracy where the flow fluctuates to low extremes. Compromises between delicate and durable forms of construction have not been satisfactory at either low or high extremes. With the present invention it now becomes possible to attain accuracy at both low and high extremes of flow rate; and a device is had which functions through widely fluctuating flow conditions. Other objects and advantages will appear from the following description.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a perspective semi-diagrammatic view of a meter in accordance with the invention, showing also the manner of mounting the same in a fluid flow pipe; and Fig. 2 is a side elevational view of the pressure-responsive elements of such meter.

In the fluid stream to be metered, there is exposed a target or flag, of suitable metal stock for example, this being mounted by a cantilever rod which has its end secured to the end of a torsion bar whose other end is fixed in a suitable anchorage. Thus, two sensing elements are coupled together, increasing the range of measurement while maintaining desirable sensitivity. The target is subjected to the direct stream pressure, and its supporting cantilever rod is stressed by the pressure and the stress measured by suitable means, as by a resistance-wire strain gauge attached to the bar; and then pressure beyond the range for the cantilever is taken by the torsion bar and in terms of torsion stress is measured by suitable means, as for instance an attached strain gauge.

A target 2, as shown in the drawing, is carried by the free end of an arm 3 whose other end is secured to the end of torsion bar 4, which in turn has its end fixedly anchored to the wall of pipe P. A strain gauge 5 by its electric circuit 6 is connected to a measuring instrument or indicator, and strain gauge 7 on the torsion bar, by its electric circuit 8 also is connected to its own measuring instrument or indicator, thus showing the flow rate in terms of instrumental indication, as for instance needle deflection; and this by calibration gives the volume flow. The resistance strain gauges, and the indicator, are of well-known constructions and require no further description here; and calibration from needle deflection in an electric circuit to other terms is conventional. An important aspect of the invention is its combining of detectable stress factors resultant from pressure of the fluid stream, the delicately mounted element 3 being arranged to first respond to the fluid pressure up to its limit of capability, and the torsion bar then taking over for excess stress thereabove. By a limit stop 10 fixed also to the end of the torsion bar 4 and positioned behind the target 2 at a slight but sufficient distance to allow its movement in proper deflection, back stop support is provided against extreme deflection which would damage the cantilever, and the pressure effect goes into the torsion bar. The total result is the pressure effect throughout its whole possible range, as translated into stress action in the cantilever system and in the torsion bar system, and final value indication instrumentally. The relatively light and easily deflected target system undergoes a stress in general proportional to the square root of the rate of fluid flow.

The deflection or bending of the flexible cantilever arm 3 in response to the initial applied pressure is of course relative to the torsion bar. Such bending, measured by the strain gauge circuit 6 associated with the arm, continues until the arm at its lower target portion is brought against the rigid heavier stop 10, whereupon further relative movement or deflection about the point of attachment of the arm to the bar is precluded. Accordingly, should the pressure now increase, the added force is transmitted through the arrested arm and the stop to the torsion bar 4 and produces proportional torsional stress therein. The latter is measured by the strain gauge 7 and its indicator circuit, and it will thus be seen that the new meter has two effective ranges, whereby both low and high rates of fluid flow may be accurately measured.

Other modes of applying the principle of the invention may be employed, change being made as regards the details described, provided the feaures stated in any of the following claims, or the equivalent of such, be employed.

We therefore particularly point out and distinctly claim as our invention:

1. A flow meter, comprising a cantilever arm, a target supported in and against a flowing stream by the cantilever arm, a first strain gauge on said arm, first deflection indicating means including an electrical circuit in which said first strain gauge is connected, a torsion bar having one end thereof anchored and said cantilever arm fixed to its other end, a second strain gauge on said torsion bar, second deflection indicating means including an electric circuit in which said second strain gauge is connected, and a limit stop spaced behind the target and fixed to the torsion bar.

2. A flow meter, comprising a cantilever arm, a target supported in and against a flowing stream by the cantilever arm, a torsion bar having one end thereof anchored and said cantilever arm fixed to its other end, a limit stop spaced behind the target and fixed to the torsion bar, and separate deflection indicating means connected to each of the cantilever arm and the torsion bar.

3. A wide range flow meter comprising a torsion member firmly anchored at one end, a cantilever rigidly mounted on said torsion member at a point spaced from such anchored end thereof, said cantilever having a target portion for exposure in a fluid stream, the cantilever being relatively flexible for deflection relative to the torsion member in response to pressure applied against its target portion, measuring means coacting with the cantilever for measuring such deflection of the same, said torsion member being twistable upon sufficient pressure being exerted against the cantilever, and separate measuring means coacting with the torsion member for measuring such twisting thereof.

4. A wide range flow meter comprising a torsion member firmly anchored at one end, a cantilever rigidly mounted on said torsion member at a point spaced from such anchored end thereof, said cantilever having a target portion for exposure in a fluid stream, the cantilever being relatively flexible for deflection relative to the torsion member in response to pressure applied against its target portion, measuring means coacting with the cantilever for measuring such deflection of the same, stop means carried by the torsion member for engagement by the cantilever upon deflection of the latter to a predetermined degree, such engagement precluding further displacement of the cantilever relative to the torsion member, said torsion member being twistable in response to pressure exerted against the cantilever in excess of that deflecting the same into engagement with said stop means, and separate measuring means coacting with the torsion member for measuring such twisting thereof.

References Cited in the file of this patent

UNITED STATES PATENTS

| | | |
|---|---|---|
| 1,249,484 | Pogue | Dec. 11, 1917 |
| 1,665,141 | Mayer | Apr. 3, 1928 |
| 1,903,713 | Baule | Apr. 11, 1933 |
| 1,958,229 | Beech | May 8, 1934 |
| 2,316,255 | Knobel et al. | Apr. 13, 1943 |
| 2,421,222 | Schaevitz | May 27, 1947 |
| 2,582,886 | Ruge | Jan. 15, 1952 |
| 2,687,646 | Goddard | Aug. 31, 1954 |

FOREIGN PATENTS

| | | |
|---|---|---|
| 631,973 | Great Britain | Nov. 14, 1949 |
| 961,641 | France | Nov. 21, 1949 |